US008488042B2

(12) United States Patent
Robinson et al.

(10) Patent No.: US 8,488,042 B2
(45) Date of Patent: Jul. 16, 2013

(54) SYSTEMS FOR CAPTURING IMAGES THROUGH A DISPLAY

(75) Inventors: Ian N Robinson, Pebble Beach, CA (US); Kar Han Tan, Sunnyvale, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 359 days.

(21) Appl. No.: 12/432,550

(22) Filed: Apr. 29, 2009

(65) Prior Publication Data

US 2010/0188548 A1 Jul. 29, 2010

Related U.S. Application Data

(63) Continuation-in-part of application No. 12/321,996, filed on Jan. 28, 2009.

(51) Int. Cl.
*H04N 5/222* (2006.01)
*H04N 7/14* (2006.01)

(52) U.S. Cl.
USPC .................. 348/333.1; 348/14.01; 348/14.05

(58) Field of Classification Search
USPC ........ 348/14.01, 14.08, 14.11, 333.1, 333.02, 348/333.12, 14.03, 207.99; 345/173, 418, 345/592; 715/751, 759
See application file for complete search history.

(56) References Cited

U.S. PATENT DOCUMENTS

| 5,025,314 | A | * | 6/1991 | Tang et al. ................ 348/14.08 |
| 5,400,069 | A | * | 3/1995 | Braun et al. .............. 348/14.16 |
| 5,666,155 | A | * | 9/1997 | Mersereau ................ 348/14.01 |
| 5,801,758 | A | * | 9/1998 | Heirich ..................... 348/14.16 |
| 6,798,409 | B2 | | 9/2004 | Thomas et al. |
| 7,084,859 | B1 | * | 8/2006 | Pryor ............................ 345/173 |
| 7,333,135 | B2 | | 2/2008 | Foote et al. |
| 7,428,000 | B2 | | 9/2008 | Cutler et al. |
| 7,489,303 | B1 | * | 2/2009 | Pryor ............................ 345/173 |
| 7,496,229 | B2 | | 2/2009 | Zhang et al. |
| 2002/0030637 | A1 | | 3/2002 | Mann |

(Continued)

FOREIGN PATENT DOCUMENTS

| KR | 1019980077855 A | 11/1998 |
| KR | 2020000000283 U | 1/2000 |

OTHER PUBLICATIONS

Jorke Etal~"INFITEC—A New Stereoscopic Visualisation Tool by Wavelength Multiplex Imaging"~www.infirec.net~ pp. 7~Publication date unknown.

(Continued)

*Primary Examiner* — Nhan T Tran

(57) ABSTRACT

Embodiments of the present invention are directed to a visual-collaborative system enabling geographically distributed groups to engage in face-to-face, interactive collaborative video conferences. In one aspect, a visual-collaborative system comprises a display screen, a camera system, and a projector. The display screen has a first surface and a second surface, and the camera system is positioned to capture images of objects through the display screen. The projector is positioned to project images onto a projection surface of the display screen, wherein the projected images can be observed by viewing the second surface. The system includes a first filter disposed between the camera and the first surface, where the first filter passes light receives by the camera but substantially blocks the light that is produced by the projector.

19 Claims, 10 Drawing Sheets

U.S. PATENT DOCUMENTS

| | | |
|---|---|---|
| 2002/0180726 A1 | 12/2002 | Shi et al. |
| 2006/0170764 A1 | 8/2006 | Hentschke |
| 2007/0266412 A1 | 11/2007 | Trowbridge et al. |
| 2008/0094588 A1* | 4/2008 | Cole et al. ............... 353/122 |
| 2008/0211779 A1* | 9/2008 | Pryor ..................... 345/173 |
| 2009/0009628 A1 | 1/2009 | Janicek |
| 2009/0109126 A1 | 4/2009 | Stevenson et al. |
| 2009/0167966 A1 | 7/2009 | Dong-kyung et al. |

OTHER PUBLICATIONS

Lemarchand, F et al~"Increasing the angular tolerance of resonant grating filters with doubly periodic structures"~Optics Letter v23 No. 15~Aug. 1, 1998~pp. 1149-1151.

Liao Etl~"Robust and Accurate Visual Echo Cancelation in a Full-duplex Projector-camera System"~IEEE Trans on Pattern Anlysis & Machine Intelligence Sep. 2006~pp. 1-7.

* cited by examiner

SYSTEMS FOR CAPTURING IMAGES THROUGH A DISPLAY

CROSS-REFERENCE TO RELATED APPLICATION

This case is a continuation-in-part of the case entitled "Systems for Capturing Images Through a Display" filed on Jan. 28, 2009, having U.S. Ser. No. 12/321,996, which is hereby incorporated by reference in it's entirety.

TECHNICAL FIELD

Embodiments of the current invention relate to remote collaboration systems.

BACKGROUND

Some of the most productive interactions in the workplace occur when a small group of people get together at a blackboard or a whiteboard and actively participate in presenting and discussing ideas. However it is very hard to support this style of interaction when one or more participants are at a different location, a situation that occurs more and more frequently as organizations become more geographically distributed. To date, conventional video-conferencing systems are not well suited to this scenario. Effective collaboration relies on the ability for the parties to see each other and the shared collaboration surface, and to see where the others are looking and/or gesturing. Conventional video-conferencing systems can use multi-user screen-sharing applications to provide a shared workspace, but there is a disconnect from the images of the remote participants and the cursors moving over the shared application.

FIGS. 1-3 show schematic representations of systems configured to project images without interfering with images captured by a camera. FIG. 1 shows a communication medium with a half-silvered mirror 102, a camera 104 located above the mirror 102, and a projector 106. The mirror 102 and the projector 106 are positioned so that an image of a person or object located at a remote site is projected by the projector 106 onto the rear surface of the half-silvered mirror 102 and is visible to a viewer 108. The camera 104 captures an image of the viewer 108 via that viewer's reflection in the mirror 102 and transmits the image to another person. The configuration of mirror 102, projector 106, and camera 104 enable the viewer 108 to have a virtual face-to-face interaction with the other person. However, close interaction between the viewer 108 and the other person can be disconcerting because the tilted screen makes for unnatural views of the remote user. FIG. 2 shows a communication medium with a switchable diffusing screen 202, a camera 204, and a projector 206. The screen 202 can be composed of a material that can be cycled rapidly between diffusive and transparent states. The state of the screen 202, projector 206, and camera 204 can be synchronized so that the projector 206 projects images when the screen is diffusive and the camera 204 captures images when the screen in transparent. However, it is difficult to design a screen that can switch fast enough to avoid flicker, and the need to synchronize these fast switching components adds to the complexity of the system and limits the projected and captured light levels. FIG. 3 shows a top view of a communication medium with two cameras 302 and 304 on each side of a display 306. Images of a viewer 308, for example, are captured by the cameras 302 and 304 and processed to create a single image of the viewer 308 which appears to be captured by a single virtual camera 310 for viewing by another person at a different location. However, an image captured in this manner typically suffers from processing artifacts, especially when the captured views are at a very different angle from the intended virtual view, as would be the case with a user close to a large screen. This system also fails to capture hand gestures near, or drawing on, the screen surface.

It is desirable to have visual-collaborative systems that project images without interfering with and diminishing the quality of the images simultaneously captured by a camera.

DETAILED DESCRIPTION

Embodiments of the present invention are directed to visual-collaborative systems enabling geographically distributed groups to engage in face-to-face, interactive collaborative video conferences. The systems include a projection display screen that enables cameras to capture images of the local objects through the display screen and send the images to a remote site. In addition, the display screen can be used to simultaneously display images from the remote site.

Figure 1:
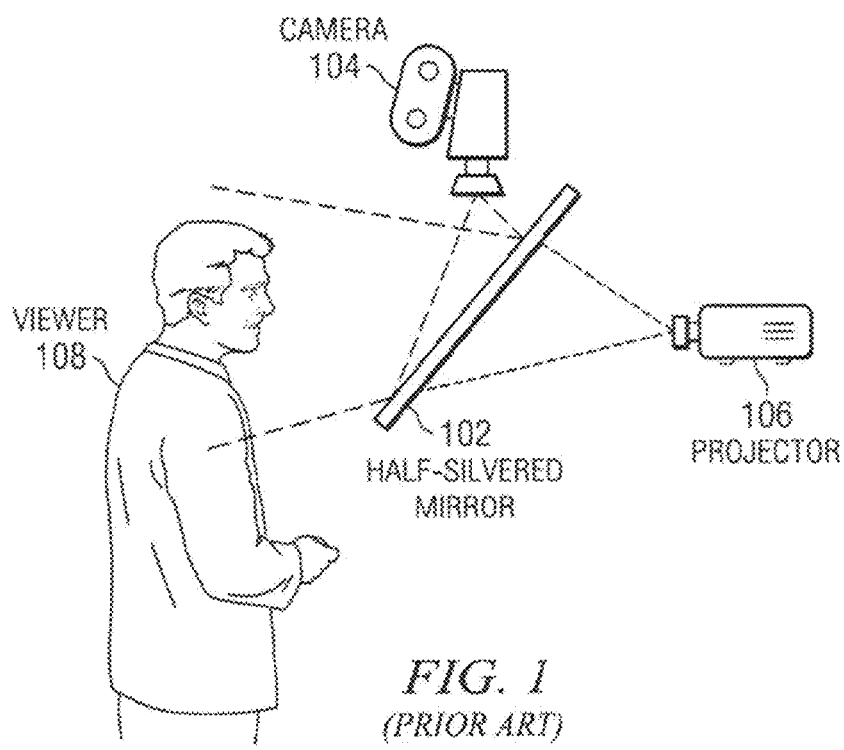
FIGS. 1-3 show schematic representations of systems configured to project images without interfering with images captured by a camera.
Figure 2:
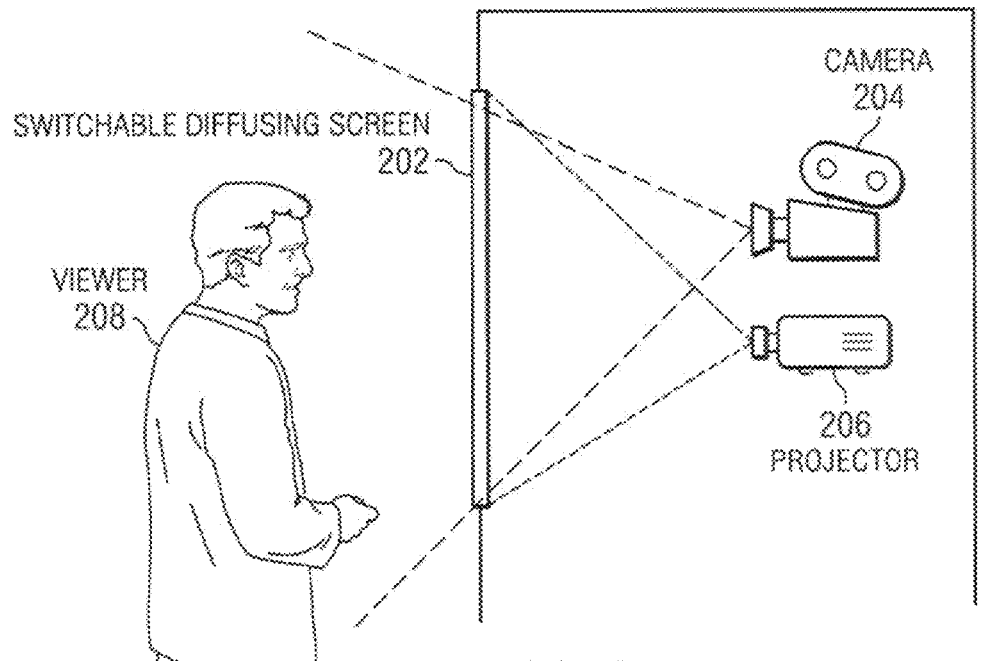
Figure 3:
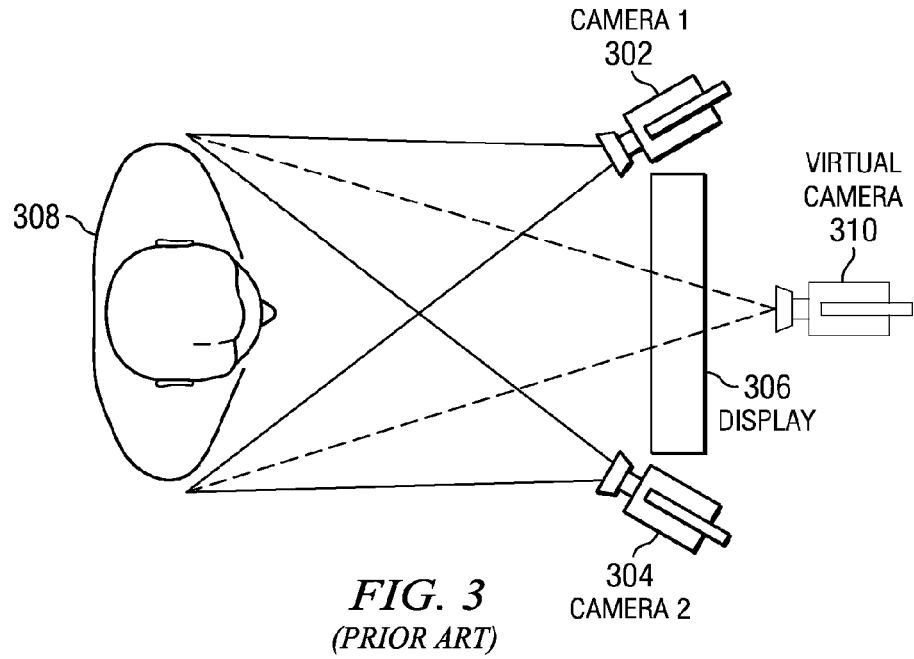
Figure 4:
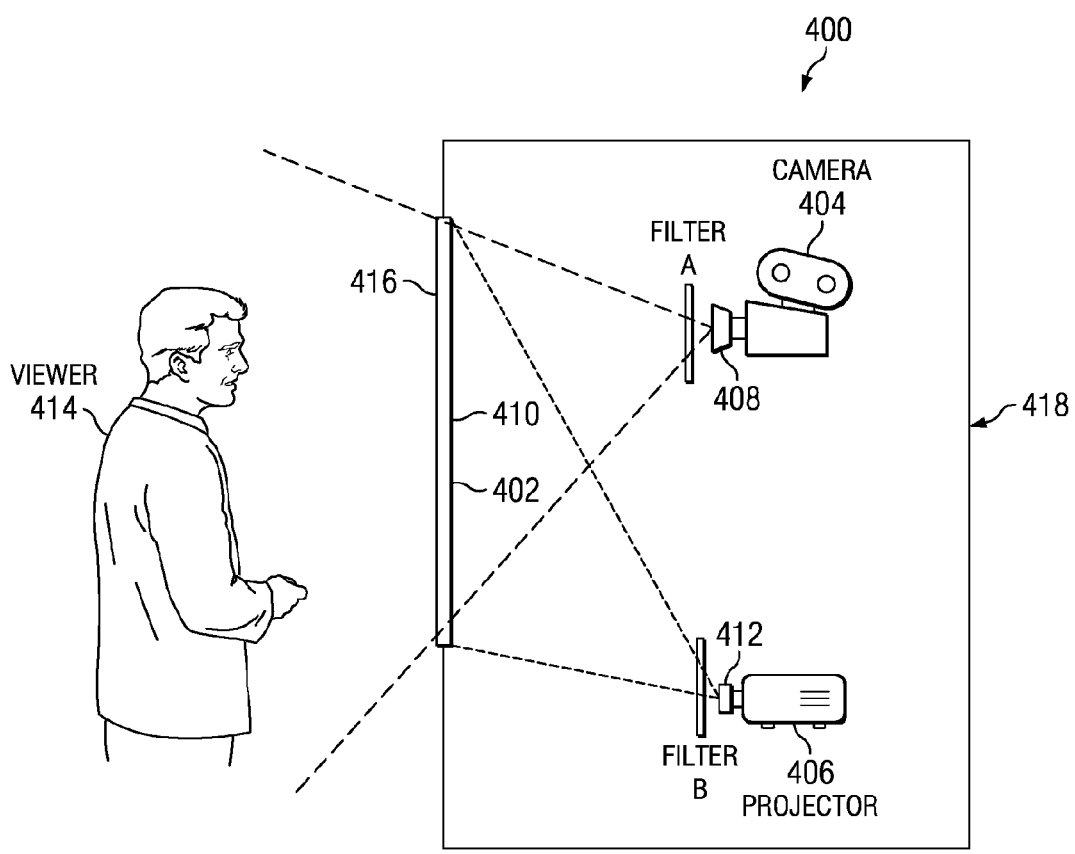
FIG. 4 shows a schematic representation of a first visual-collaborative system configured in accordance with embodiments of the present invention.

FIG. 4 shows a schematic representation of a visual-collaborative system 400 configured in accordance with embodiments of the present invention. The system 400 comprises a display screen 402, a camera 404, and a projector 406 and includes a filter A disposed between the camera lens 408 and the screen 402 and a filter B disposed between the projector lens 412 and the screen 402. The camera lens 408 and projector lens 412 are positioned to face the same first surface 410 of the display screen 402. In the embodiments described in FIGS. 4-9, the screen 402 is a rear projection display screen. However, the rear projection implementation shown is for purposes of example only and the screen 402 may also be a front projection display screen. A front projection implementation is shown in FIGS. 10-13.

Referring to FIG. 4, the screen 402 is a rear projection display screen comprising a screen material that diffuses light striking the first surface 410 within a first range of angles. The projector 406 is positioned to project images onto the first surface 410 within the first range of angles. A viewer 414 facing the outer second surface 416 of the screen 402 sees the images projected onto the screen 402 from the projector 406. The screen 402 is also configured to transmit light scattered from objects facing the second surface 416. In other words, the camera lens 408 is positioned to face the first surface 410 so that light scattered off of objects facing the second surface 416 pass through the display screen and is captured as images of the objects by the camera 404.

In certain embodiments, the display screen 402 comprises a relatively low concentration of diffusing particles embedded within a transparent screen medium. The low concentration of diffusing particles allows a camera 404 to capture an image through the screen (providing the subject is well lit), while diffusing enough of the light from the projector 406 to form an image on the screen. In other embodiments, the display screen 402 can be a holographic film that has been configured to accept light from the projector 406 within a first range of angles and transmit light that is visible to the viewer 414 within a different range of viewing angles. The holographic film is otherwise transparent. In both embodiments, light projected onto the first surface 410 within the first range of angles can be observed by viewing the second surface 416, but light striking the second surface 416 is transmitted through the screen 402 to the camera. However, in both embodiments the camera 404 also captures light from the projector 406 diffused or scattered off the first surface 410.

In order to prevent ambient light from striking the first surface 410 of the screen 402 and reducing the contrast of the projected and captured images, the system 400 may also include a housing 418 enclosing the camera 404 and projector 406. The housing 418 is configured with an opening enclosing the boundaries of the screen 402 and is configured so that light can only enter and exit the housing 418 through the screen 402.

As shown in FIG. 4, filters A and B are positioned so that light output from the projector 406 passes through filter B before striking the first surface 410 and light captured by the camera 404 passes through filter A. The filters A and B are configured to prevent light produced by the projector 406 and scattered or diffused from the screen 402 from interfering with light transmitted through the screen 402 and captured by the camera 404. In one embodiment, this is achieved using complementary filters to block different components of light. In one embodiment, filter A passes through light that would be blocked by filter B. Similarly, filter B passes light that would be blocked by filter A. In this way, light from the projector 406 that is diffused or scattered off the first surface may be blocked.

This implementation (filter A passing light blocked by filter B and filter B passing light blocked by filter A) is implemented in FIG. 4 where the camera system includes a first filter (filter A) that is disposed between the camera and the first surface of the display screen. Filter A passes the light received by the camera, except for the light produced by the projector (which it blocks). A second filter (filter B) disposed between the light source of the projector and the projection surface of the display screen, wherein the second filter passes light output by the projector that is blocked by the first filter.

If the material used for the display screen 402 maintains polarization of scattered light, and if the projectors used are the type which result in no polarization of the light output from the projectors, then polarized filters may be used. In one embodiment, the complementary filters A and B are polarizing filters, where polarizing filter A has a first direction of orientation that is different than the direction of orientation of polarizing filter B. In one embodiment, the filters are circularly polarized, where the polarization for one filter is right circularly polarized and the polarization for the other filter is left circularly polarized. In one embodiment, the two filters are polarized linearly. In this embodiment, one filter is polarized horizontally while the other filter is polarized vertically.

Although the term blocked is used throughout the application, it is realized that in some cases a filter might not block 100% of the light of the complementary filter so that the filters are completely non-overlapping. However, when the filters are non-overlapping, the best performance is typically achieved. For example, in the embodiment where the filters are linearly polarized with one filter (assume for purposes of example filter A) is polarized horizontally and the other filter (filter B) is polarized vertically, preferably, the direction of orientation of the filters is orthogonal to each other. In this implementation, the filters are non-overlapping and filter A blocks light that would not be blocked by filter B and filter B blocks light that would not be blocked by filter A. Although orientations other than a 90 degree orthogonal positioning may be used, this is not desirable since as the orientation of the two filters moves further away from it's orthogonal positioning, relative to each other, the further the system performance is decreased.

For purposes of example, assume that filter A is positioned at an 88 degree angle relative to filter B (as opposed to the preferred 90 degree positioning.) Although the filters are not completely non-overlapping, typically the filter arrangement would still provide a configuration that would substantially block light from the complementary filter such that performance is not noticeably degraded to the viewer (as compared to the 90 degree orthogonal positioning). The degree to which the images are visually degraded is to some extent a function of the media content and the environment (brightness, etc) of the viewers. For example, if the media content includes a black and white checkerboard image (high brightness for white image and high contrast), an 88 degree relative positioning may not be sufficiently non-overlapping to provide an image that is not noticeably degraded. In contrast, if the media content is relatively dark compared to the checkerboard content or the viewer is an a low light environment for example, an 88 degree relative positioning of the filter may provide little if any noticeable degradation by the viewer. Thus for this case, the 88 degree relative position which substantially blocks (but not completely blocks) the light produced by the projector results in minimum degradation of performance. Thus "block" and "substantially blocked" may be used interchangeable as long as difference in blocking results in visual degradation that is either minimal or not apparent to the viewer. Light that is "substantially blocked" by a filter may correspondingly be "substantially transmitted" by it's complementary filter.

As previously noted, it is desirable for the filters A and B to be configured to prevent light produced by the projector and scattered or diffused from the screen 402 from interfering with light transmitted through the screen 402 and captured by the camera 404. In the embodiment previously described, this is accomplished using a first type of filter, a polarized filter. However, other types of filters may be used. In an alternative embodiment, this can be achieved using a second type of filter, a wavelength division filter.

In particular, filter B can be configured to transmit a first set of wavelengths ranges that when combined create the visual sensation of a much broader range of colors in projecting images on the display screen 402, and filter A can be configured to transmit a second set of wavelength ranges that are different from the first set of wavelength ranges. The second set of wavelength ranges can also be used to create the visual sensation of a much broader range of colors. In other words, filter A is configured and positioned to block the wavelength ranges that are used to create images on the display screen 402 from entering the camera lens 408. Even though the wavelength ranges used to produce images viewed by the viewer 414 are different from the wavelengths of light used to capture images by the camera 404, the projector 406 can still use the colors transmitted through filter B to project full color images and light transmitted through filter A and captured by the camera 404 can still be used to record and send full color images. It is the component wavelengths of the light used to project and capture the full color images that are prevented from interfering. Similar to the descriptions with respect to polarized filters, wavelength division filters may not completely be non-overlapping so that a filter may substantially block a set of wavelength ranges.

Figure 5:
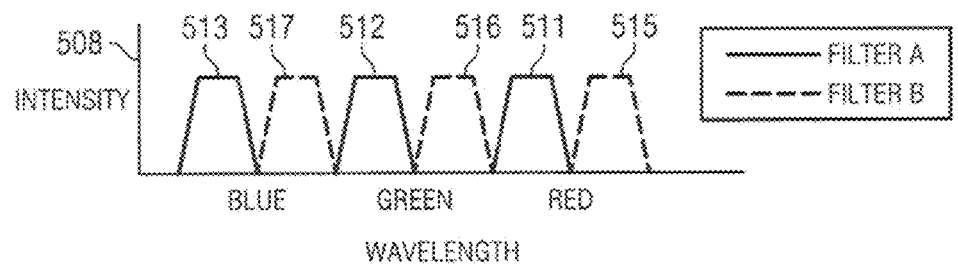
FIG. 5 shows a plot of exemplary wavelength ranges over which two filters transmit light in accordance with embodiments of the present invention.

FIG. 5 shows exemplary plots 502 and 504 of wavelength ranges over which filters A and B, respectively, can be configured to transmit light in accordance with embodiments of the present invention. Horizontal line 506 represents the range of wavelengths comprising the visual spectrum. Vertical axes 508 and 510 represents intensities of light transmitted through filters A and B, respectively. As shown in FIG. 5, the red, green and blue portions of the spectrum are each split into two halves with curves 511-513 representing relatively shorter wavelength rangers of the red, green, and blue portions of visible spectrum transmitted through filter A and curves 515-517 representing relatively longer wavelength ranges of the red, green, and blue portions of visible spectrum transmitted through filter B. As shown in FIG. 5, filters A and B do not transmit the same wavelength ranges of the red, green, and blue portions of the visible spectrum. In particular, filter A is configured to transmit shorter wavelength ranges of the red, green, and blue portions of the visible spectrum, and substantially block the longer wavelength ranges of the red, green, and blue portions of the spectrum. In contrast, filter B is configured to transmit the longer wavelength ranges of the red, green, and blue portions of the visible spectrum and substantially block the short wavelength ranges of the red, green, and blue portions of the visible spectrum. Both sets of red, green, and blue wavelengths can be treated as primary colors that can be combined to produce a full range of colors in projecting images on the display screen 402 and capturing images through the display screen 402. Thus, the combination of filters A and B effectively block the light used to project color images on the display screen 402 form being back scattered and interfering with the color images captured by the camera 404.

In other embodiments, operation of the filters A and B can be reversed. In other words, filter A can transmit the longer wavelength ranges of the red, green, and blue portions of the visual spectrum while filter B transmits the shorter wavelength ranges of the red, green, and blue portions of the visible spectrum.

Figure 6:
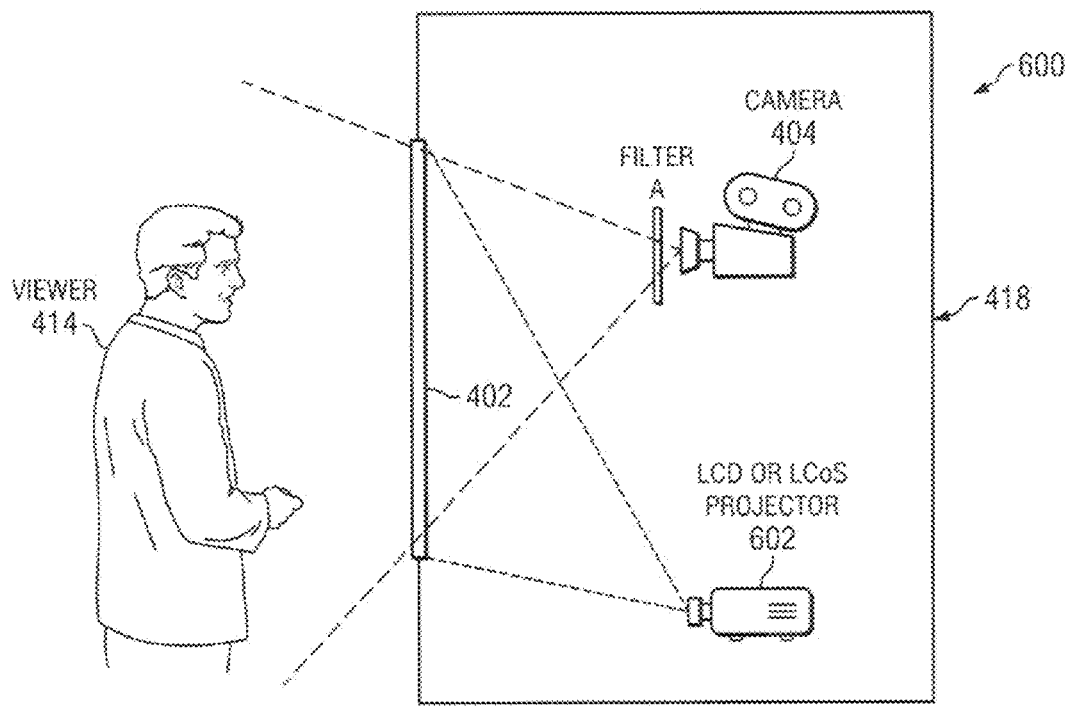
FIG. 6 shows a schematic representation of a second visual-collaborative system configured in accordance with embodiments of the present invention.

FIG. 6 shows a visual-collaborative system 600 configured in accordance with embodiments of the present invention. The system 600 is nearly identical to the system 400 except filter B and the projector 406 are replaced with a single projector 602 configured to project color images using wavelength ranges that are blocked by filter A. For example, the projector 602 can be a conventional projector using three microdisplays and color splitting optics that send red, green and blue light from the projector bulb to the corresponding display. The microdisplays can be well-known liquid crystal display ("LCD"), liquid crystal on silicon ("LCoS"), or digital-micromirror device ("DMD") technologies. In such a system, the functionality of filter B can be incorporated into the color splitting optics within the projector 602. Filter A is configured to transmit wavelength ranges other than the wavelengths reflected by the color splitter, as described above with reference to FIG. 5. For example, the internal color splitter can be a series of dichroic mirrors that each reflects one of the primary colors to a separate microdisplay, while passing other wavelengths of light. Each reflected color is modulated by the corresponding microdisplay, and the colors are recombined to produce images that are projected onto the first surface 410. Each microdisplay provides pixelized control of the intensity of one color. The colors not reflected by the color splitter are discarded. For example, in order to produce a red object, the microdisplays corresponding to projecting green and blue light are operated to block green and blue light from passing through the projector 602 lens.

In other embodiments, the lamp producing white light and the internal color splitter of the projector 602 can be replaced by separate lasers, each laser generating a narrow wavelength range of light that when combined with appropriate intensities produce a full range of colors. For example, the lamp and internal color splitter can be replaced by three lasers, each laser generating one of the three primary colors, red, green, and blue. Each color produced by a different laser passes through a corresponding LCD or is reflected off of a corresponding LCoS and the colors are recombined within the projector 602 to project full color images onto the first surface 410. Note that the use of a relatively narrow set of wavelengths at the projector allows the complementary set of wavelengths passed by filter A to be relatively broader, allowing more light into the captured image.

In other embodiments the function of filter A could be incorporated into the camera optics. For example the color filter mosaic that forms part of a camera's image sensor could be selected to pass only selected wavelengths.

Figure 7A:
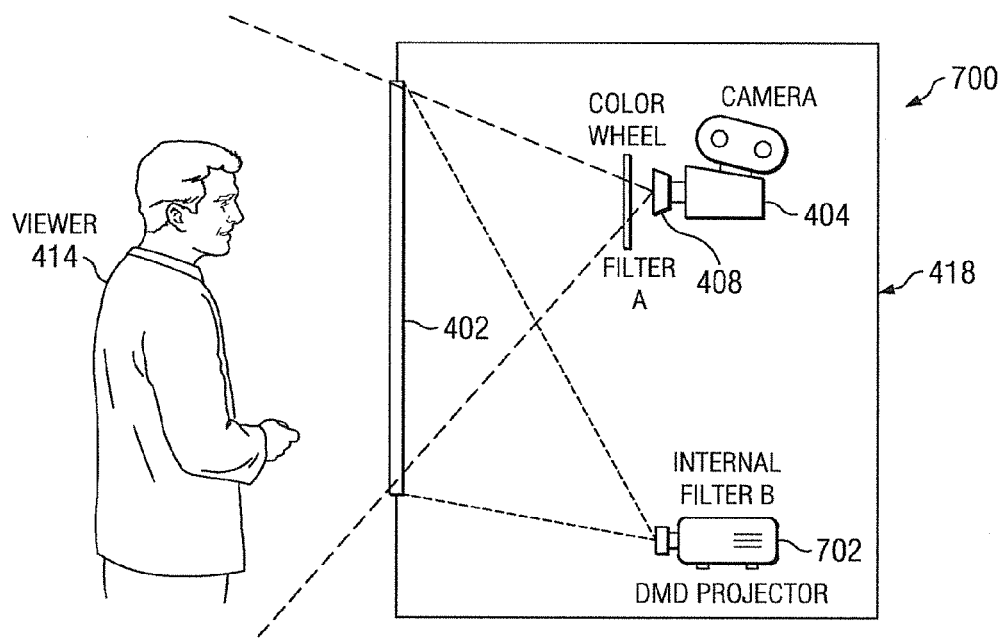
FIG. 7A shows a schematic representation of a third visual-collaborative system configured in accordance with embodiments of the present invention.
Figure 7B:
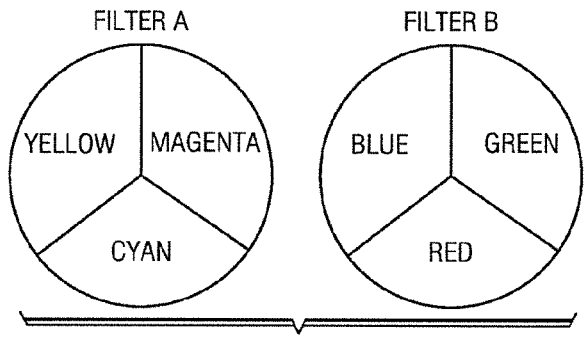
FIG. 7B shows two color wheels configured in accordance with embodiments of the present invention.

FIG. 7A shows a visual-collaborative system 700 configured in accordance with embodiments of the present invention. The system 700 is nearly identical to the system 400 except filter B and the projector 406 are replaced with a sequential color projector 702. An example of such a projector is a "DMD projector" that includes a single digital micromirror device and a color wheel filter B comprising red, green, and blue segments. The color wheel filter B spins between a lamp and the DMD, sequentially adding red, green, and blue light to the image displayed by the projector 702. Also, filter A is replaced by a second color wheel filter A which contains filters that transmit complementary colors to those of filter B. For example, as shown in FIG. 7B, the color wheel filter A can use cyan, yellow, and magenta transparent color panels to sequentially block the color being projected through the color wheel filter A. Color wheel filters A and B can be synchronized so that when the color wheel filter A transmits one color the color wheel filter B transmits a complementary color. For example, when the red panel of the color wheel filter B passes between the lamp and the DMD of the projector 702, the color red is projected onto the screen 402 while the cyan panel of the color wheel filter A covers the lens 408 enabling the camera 404 to capture only green and blue light and ignore the projected red light.

Figure 7C:
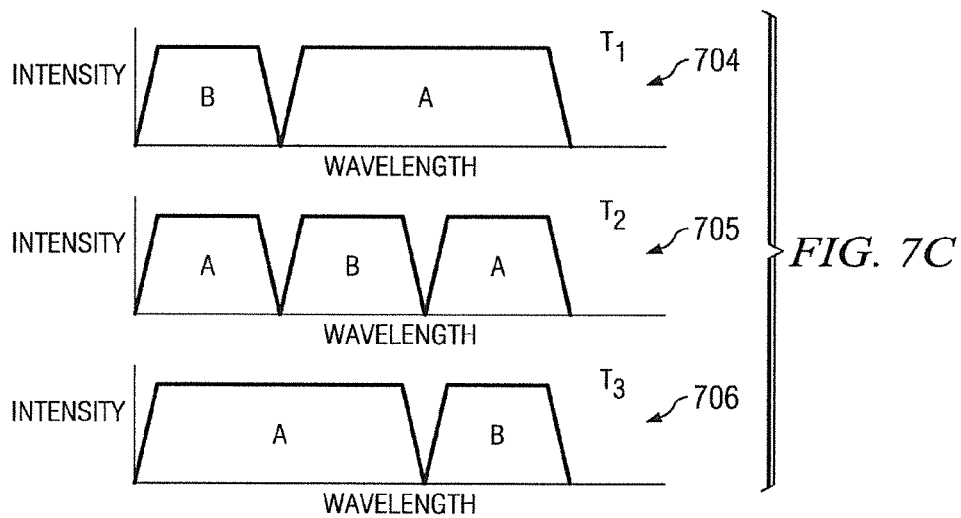
FIG. 7C shows plots of exemplary wavelength ranges over which two filters transmit light in accordance with embodiments of the present invention

FIG. 7C shows exemplary plots 704-706 of wavelength ranges over which color wheel filters A and B, respectively, can be operated to transmit light in accordance with embodiments of the present invention. Plot 704 shows that at a first time $T_1$, filter B passes a different range of wavelengths than filter A. Plot 705 shows that at a later second time $T_2$, filter B passes a range of wavelengths sandwiched between two different wavelength ranges passed by filter A. Plot 706 shows that at a later time $T_3$, filter B again passes a different range of wavelengths than filter A. In other words, plots 704-706 reveal that at any given time, filters A and B are operated to pass different wavelength ranges. Plots 704-706 also reveal that Filters A and B can be operated to pass wavelengths over the same wavelength ranges, but not at the same time.

Figure 8:
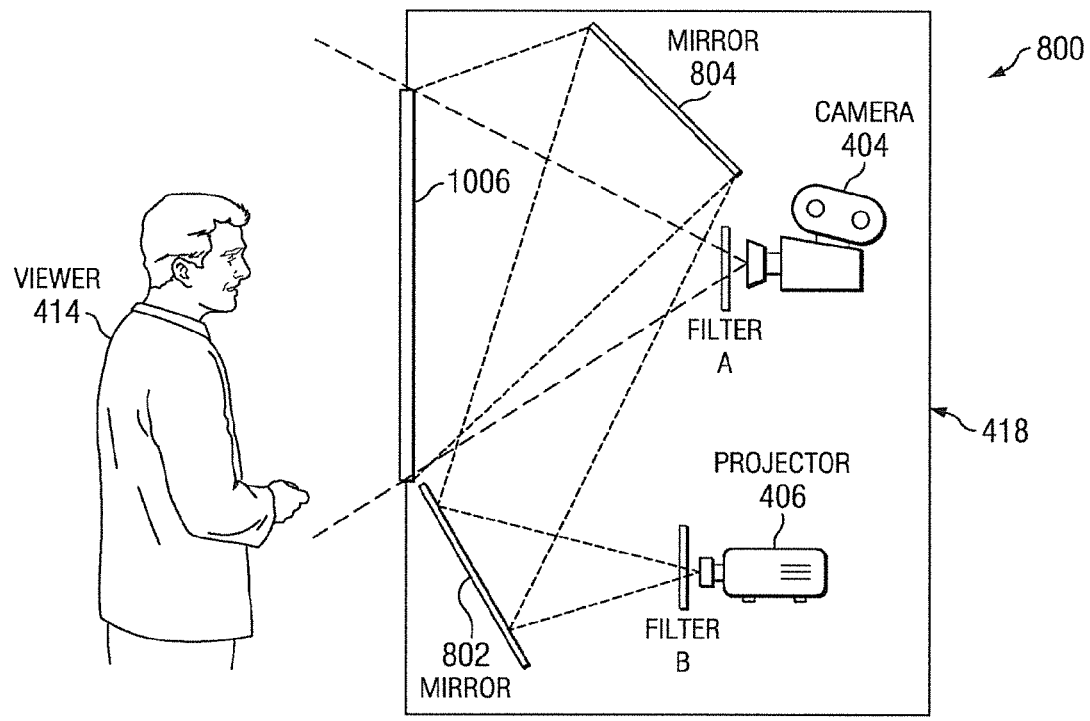
FIG. 8 shows a schematic representation of a sixth visual-collaborative system configured in accordance with embodiments of the present invention.

In still other embodiments, the housing 418 can include fully reflective mirrors that reflect projected images onto a display screen within the range of angles for which the screen is diffusive. FIG. 8 shows a visual-collaborative system 800 configured in accordance with embodiments of the present invention. The system 800 is nearly identical to the system 400 except mirrors 802 and 804 are included to reflect images produced by the projector 406 onto a display screen 806 within a range of angle for which the screen 806 is diffusive.

Figure 9:
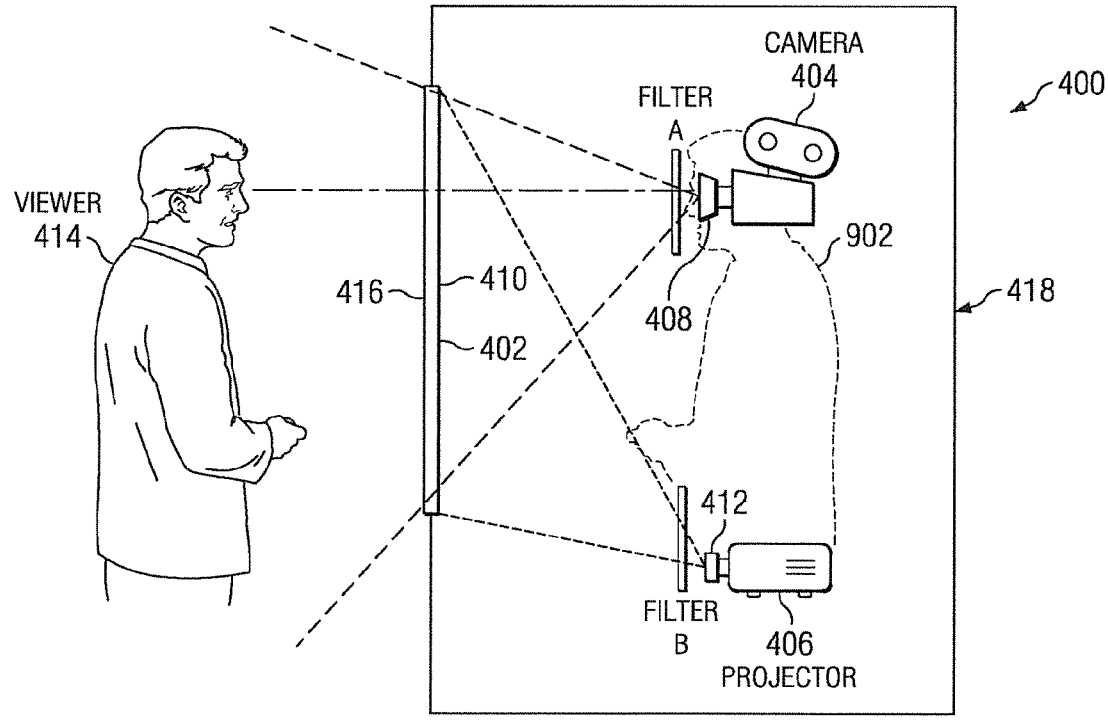
FIG. 9 shows a camera positioned at approximately eye level to a viewer in accordance with embodiments of the present invention.

The visual-collaborative systems described above with reference to FIGS. 4-8 can be used in interactive video conferencing. The camera 404 and projector 406 can be positioned so that the display screen 402 acts as a window to a remote site. This can be accomplished by positioning the camera 404 at approximately eye level to the viewer 414 facing the second surface 416 and at approximately the same distance the viewer 414 would feel comfortable standing away from the screen. FIG. 9 shows the camera 404 positioned at approximately eye level to the viewer 414 in accordance with embodiments of the present invention. As a result, the viewer 414 appears face-to-face with a second viewer represented by dashed-line FIG. 902 located at a remote site. The second viewer 902 and the viewer 414 can engage in an interactive, virtual, face-to-face conversation with the display screen 402 serving as a window through which the second viewer and the viewer 414 can clearly see each other.

Figure 10:
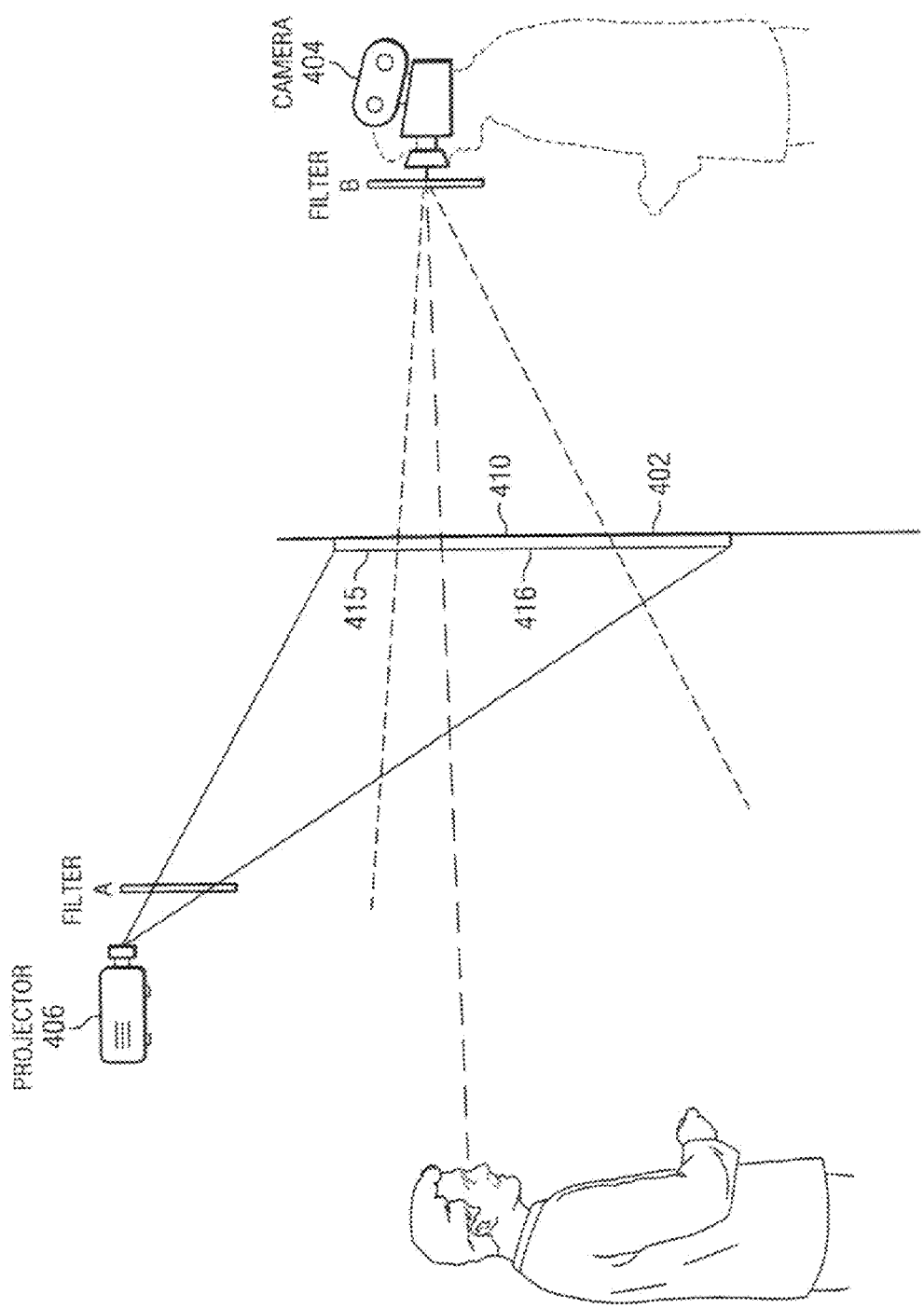
FIG. 10 shows a schematic representation of a seventh visual-collaborative system configured in accordance with embodiments of the present invention.

FIG. 10 shows a schematic representation of a seventh visual-collaborative system configured in accordance with embodiments of the present invention. As previously stated, FIGS. 4-9 are shown implemented using a rear-projection configuration. The visual-collaboration systems shown in FIGS. 10-13 are implemented using a front-projection implementation. The systems are similar in that in both rear and front projection systems project images onto a projection surface where the projected image is visible on the second surface of the display screen. However, the position of the camera and possibly the materials used for the display screen or the display screen configuration may be different.

Similar to the implementation shown in FIG. 4, the embodiment shown in FIG. 10 includes a display screen 402, a camera lens 404, and a projector 406. However, instead of being positioned behind or in the rear of the screen (relative to the viewer 414), the projector 406 in FIG. 10 is positioned in front of the display screen. The projector 406 projects an image onto a projecting surface 415. In this case, the projection surface 415 is the second surface of the display screen 102. The projected image is diffusely reflected off the second surface and can be observed by viewing the second surface.

In FIG. 10 the display screen 402 is a front-projection display screen. In one embodiment, the display screen 402 is comprised of a partially diffusing material that diffuses light striking it within a first and second range of angles. A viewer 414 facing the outer second surface 416 of the screen 402 sees the images projected onto the screen 402 from the projector 406. Similar to the embodiments described in FIGS. 4-9, the screen is configured to transmit light scattered from objects facing the second surface 416. In other words, the lens of the camera is positioned to face the first surface 410 so that light from objects facing the second surface 416 pass through the display screen and is captured by the camera 404.

In one embodiment, the display screen is comprised of a material that has a relatively low concentration of diffusing particles embedded within a transparent screen medium. The low concentration of diffusing particles allows a camera 404 to capture an image through the screen (providing the subject is well lit), while it diffuses enough of the light from the projector 406 to form an image on the screen. In an alternative embodiment, the display screen 402 is comprised of a holographic film that has been configured to accept light from the projector 406 within a first range of angles and reflect light that is visible to the viewer 414 within a different range of viewing angles. In some cases, the screen's partially diffusing material may not have sufficient reflective properties to reflect the projected image from the second surface of the display screen. In this case, the display screen includes a half silvered material (not shown) may be positioned directly behind and preferably in contact with the first surface of the display screen. The half silvered mirror will allow transmission of light through the display screen while enhancing the reflectivity of the holographic film.

In the front projection screen embodiment, the light projected onto the second surface within the first range of angles is diffused by the screen and can be observed by viewing the second surface 416 and light scattered off of objects facing the second surface are transmitted through the display screen to the camera. In the front projection embodiment, light from the projector that is transmitted through the display screen can degrade the performance of the system. In order to minimize this degradation, a filter A disposed between the camera and the first surface of the display screen is used to block the light received by the camera that is produced by the projector. In addition, in the preferred embodiment a filter B disposed between the projector's light source and the projection surface (in this case the second surface) where the second filter passes light output by the projector that is blocked by the first filter.

Figure 11:
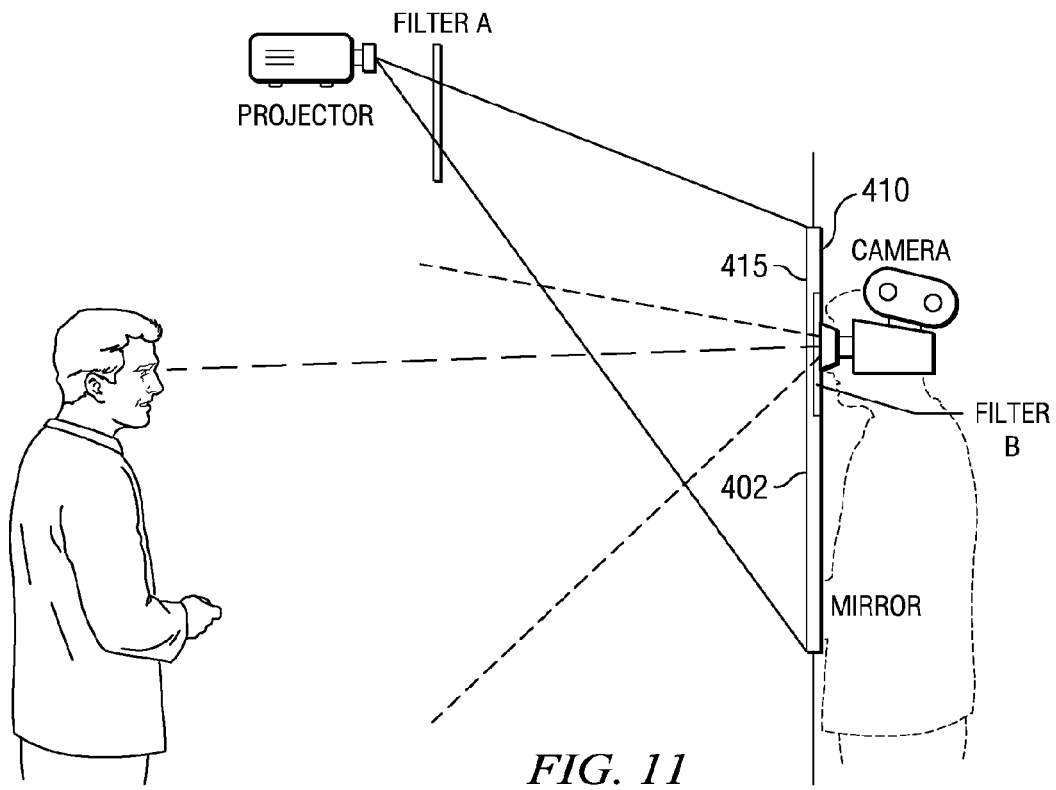
FIG. 11 shows a schematic representation of an eight visual-collaborative system configured in accordance with embodiments of the present invention.

Referring to FIG. 11 shows a schematic representation of an eight visual-collaborative system configured in accordance with embodiments of the present invention. The implementation of the embodiment shown in FIG. 11, is similar to that of FIG. 10, except for the camera placement and the addition of a mirror 480. The mirror 480 is a completely reflective mirror with an opening 482 for the placement of the filter B. Although the completely reflective mirror improves the projection image, light cannot pass through it. Thus, the camera's position changes. In one embodiment, the camera is positioned so that it is in physical contact with the display system filter B. Since the camera is not a distance away from the display screen, any writings on the display screen such as is shown in FIG. 14, are not easily viewable.

Figure 12:
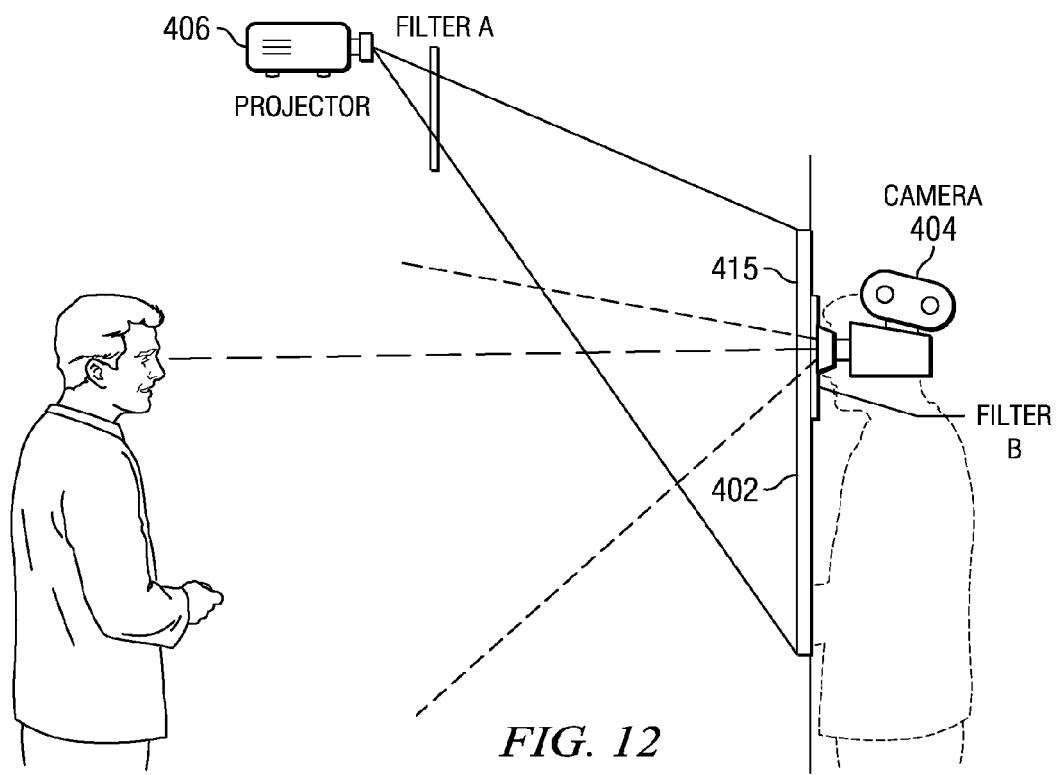
FIG. 12 shows a schematic representation of a ninth visual-collaborative system configured in accordance with embodiments of the present invention.

Referring to FIG. 12 shows a schematic representation of a ninth visual-collaborative system in accordance with embodiments of the present invention. The implementation of the embodiment shown in FIG. 12 is similar to that shown in FIG. 10. However, instead of the display screen being comprised of a partially diffusing material, the display screen is comprised of standard front-projection screen material. The replacement of the display screen with standard projection screen material decreases costs. However, because the standard projection screen material does not transmit light, the implementation of a collaborative board as shown in FIGS. 14A and 14B is not feasible using this configuration. In the embodiment shown in FIG. 13A-13B, the display screen includes an opening. Similar to the embodiment shown in FIG. 12, a filter A is positioned so that the filter covers the opening. A camera is positioned so that it's lens abuts the filters so that light received by the camera is filtered by filter A.

Figure 13A:
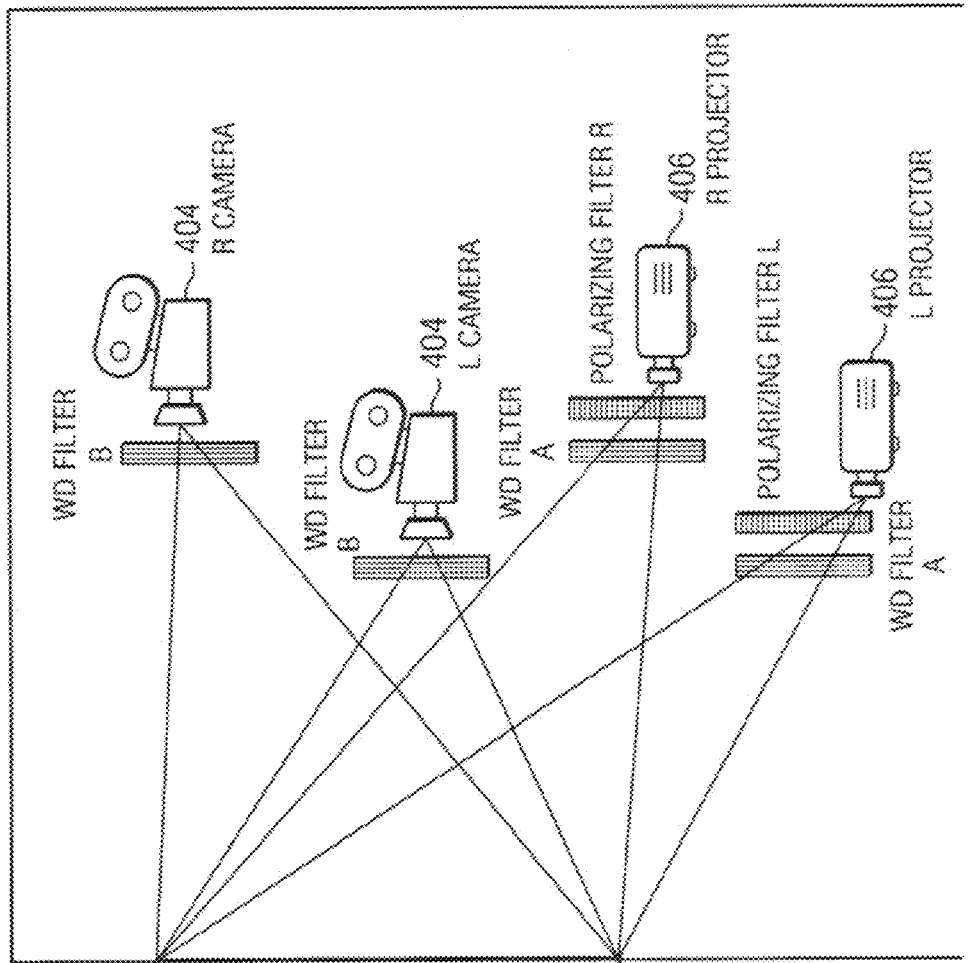
FIGS. 13A-13B show a schematic representation of a tenth visual-collaborative system configured in accordance with embodiments of the present invention
Figure 13A:
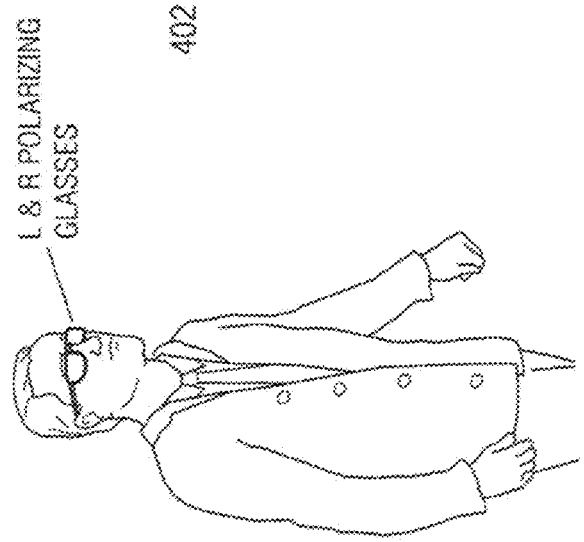
Figure 13B:
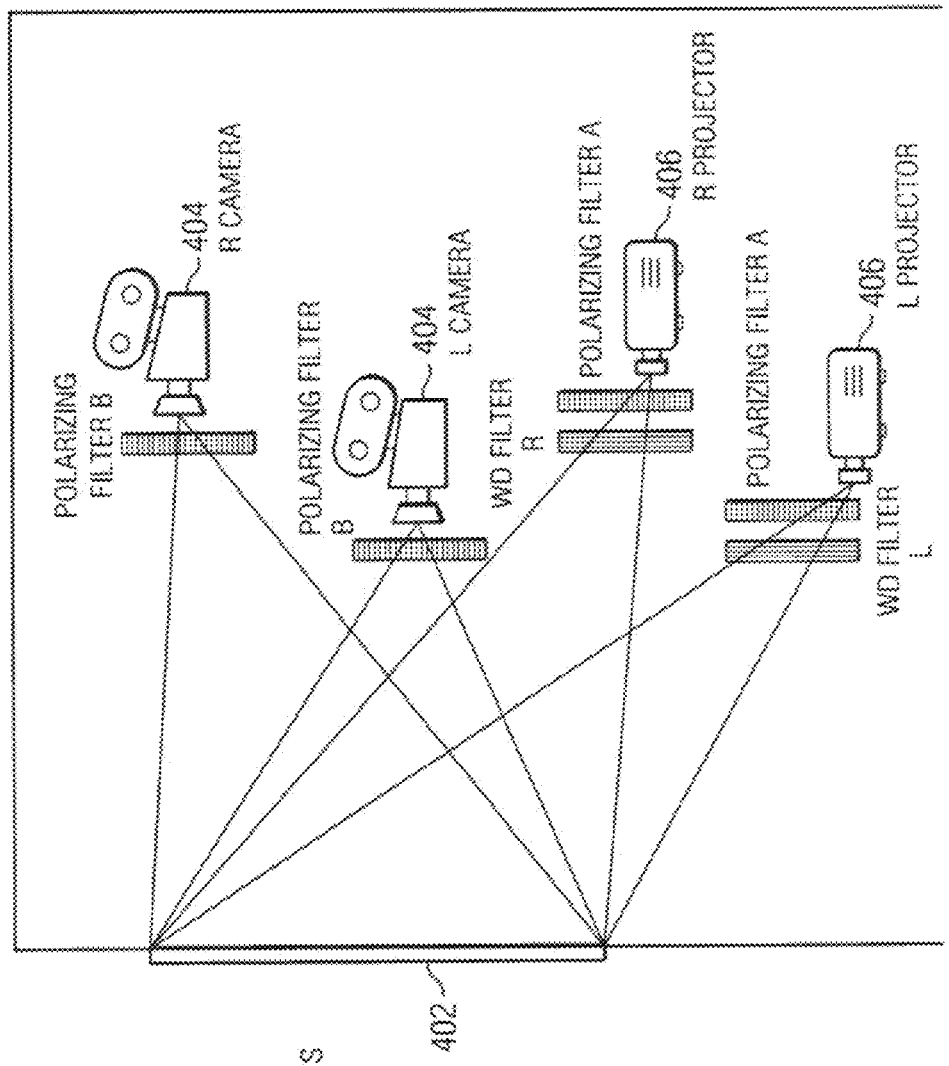
Figure 14A:
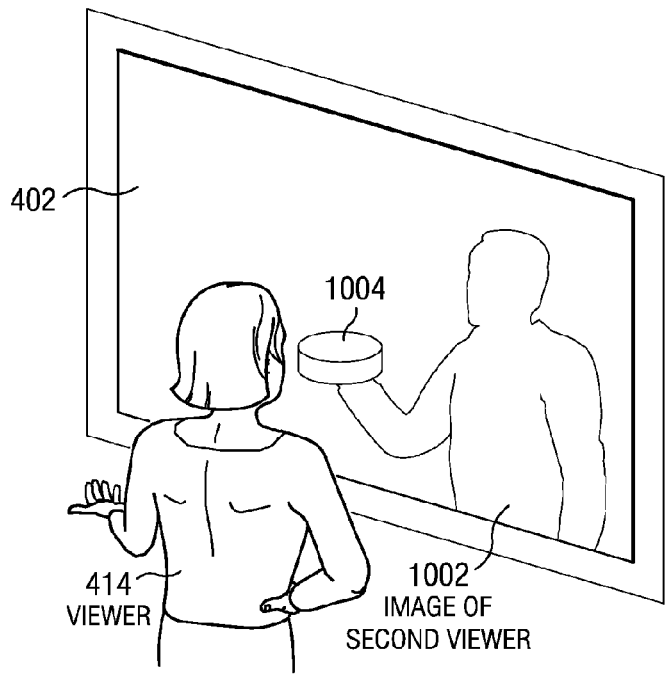
FIGS. 14A-14B show isometric views of interactive video conferencing using visual-collaborative systems in accordance with embodiments of the present invention.
Figure 14B:
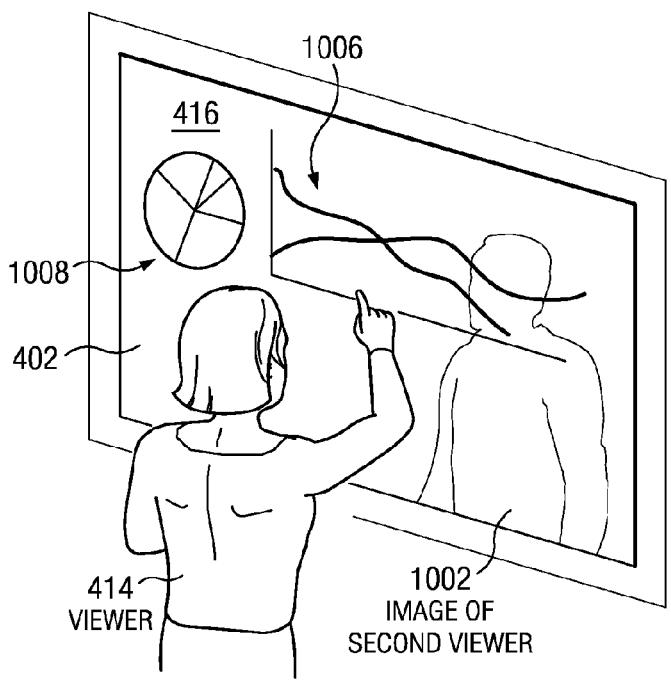

Referring to FIGS. 13A-13B shows a schematic representation of a tenth representation of an embodiment of the present invention. The representation in FIGS. 13A-13B shows a rear projection screen implementation which is capable of projecting and capturing stereoscopic 3D images. Although the embodiments shown in FIGS. 13A-13B show a rear projection screen implementation, alternatively the embodiments could be used in a front projection screen implementation. In both the rear projection screen and front projection screen implementations, instead of a single projector, two projectors, a right projector and a left projector are used, Although FIGS. 13A and 13B show two cameras, a right camera and a left camera, alternatively a single camera may be used. In the case where two cameras and two projectors are used, the remote user and the projected image will both appear in 3D. In the embodiment where a single camera is used, the remote user will no longer appear in 3D, however, the projected image will still appear in 3D.

Similar to the embodiments described with respect to FIGS. 4-11, light produced from each projector is blocked by the filters that pass light received by each camera. For the 3D implementation to work, the screen material for the embodiments shown in FIGS. 13A-B needs to be polarizing-preserving material. In the embodiment shown in FIG. 13A, each camera has an identical wavelength division filter. For the projector, two different filters (a polarizing filter and a wavelength division filter) are used for each projector. For simplification purposes, the projectors used in the described implementation are the type which result in no polarization of the light output from the projectors.

In the embodiment shown in FIG. 13A, the two wavelength division filters A are identical. The two polarizing filters are of the same type. For example, in one embodiment, the two polarizing filters are circularly polarized filters where one filters is a right circularly polarized filter and the other filter is left circularly polarized filter. In another embodiment, the polarized filters are linearly polarized where the two polarizing filters are preferably orthogonal to each other. For example in one embodiment, for the left projector, a 45 degree polarizing filter is used for the polarizing filter L and a wavelength division color filter is used for WD filter A. For the right projector, a −45 degree polarizing filter is used for polarizing filter R and a wavelength division color filter is used for WD filter A. The two wavelength division color filters used for the Right Projector and the Left Projector should be identical. In the embodiment shown in FIG. 13A, the 3D image can be seen using L&R polarizing glasses.

In the embodiment shown in FIG. 13B, instead of the filters for the cameras being identical wavelength division filters, they are identical polarizing filters B. In the embodiment shown in FIG. 13B, again each projector has two corresponding different filters (a polarizing filter and a wavelength division filter). Again for simplification purposes, the projectors used in the described implementation are the type which result in no polarization of the light output from the projectors.

In the embodiment shown in FIG. 13B, the two filters used in conjunction with the projectors are wavelength division filters that block different components of light. The polarizing filters used in conjunction with the projectors are of the same type. In the embodiment shown in FIG. 13B, the 3D image can be seen using wavelength division L&R glasses.

FIG. 14A shows an isometric view of an interactive video conference between the viewer 414 and a projected image of a second viewer 1002 located at a remote site in accordance with embodiments of the present invention. The second viewer 902 is projected on the display screen 402 by the projector (not shown), as described above with reference to FIGS. 4-13. As shown in FIG. 14A, a visual-collaborative system configured in accordance with embodiments of the present invention enables the second viewer 1002 to visually display and present an object 1004 for the viewer 414 from the remote site.

In other embodiments, the second surface 416 of the display screen 402 can be configured or coated with a transparent and erasable material enabling the viewer 414 to write and erase on the second surface 416 during an interactive video conference. In other embodiments a transparent, electronic, interactive surface (e.g., a touch screen) may be disposed on the second surface 416 of display screen 402, enabling the viewer 414 to draw, or otherwise interact with computer generated imagery overlaid on the video image of the remote user 1002 projected on the screen. In still other embodiments, other optical or ultrasound based tracking techniques may be used to track the viewer's 414 gestures or a pointer in order to interact with the computer generated imagery. In all these embodiments, the video images of the viewers 414 and 1002 are relayed between the local and remote sites and are mirrored horizontally so that the remote viewer 1002's writing appears correctly oriented for the viewer 414. FIG. 14B shows an isometric view of a video conference between the viewer 414 and the second viewer 1002 with the second surface 416 configured as a transparent writing surface in accordance with embodiments of the present invention. As shown in FIG. 14B, the viewer 414 has drawn a graph 1006 on the second surface 416. The camera 404 (not shown) located behind the screen 402 captures an image of the viewer 402 and the graph 1006, which can be observed by the second viewer 1002. The display screen 402 also exhibits a pie chart 1008 drawn by the second viewer 702 on a similar transparent writing surface at the remote site. The projector 406 (not shown) displays the second viewer 1002 and the chart 1008 for observation by the viewer 414.

Figure 15:
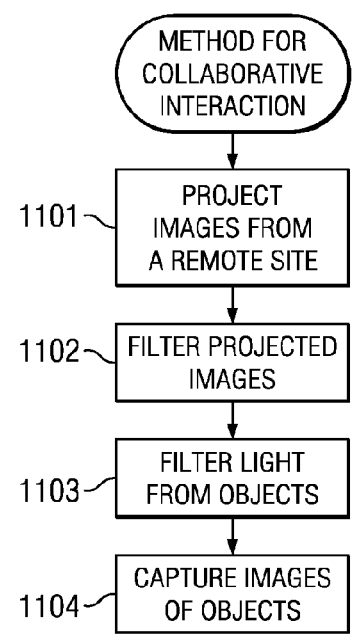
FIG. 15 shows a flow diagram for a method for video collaborative interaction in accordance with embodiments of the present invention.

FIG. 15 shows a flow diagram for a method for video collaborative interaction method in accordance with embodiments of the present invention. Steps 1101-1104 do not have to be completed in any particular order and can be performed at the same time. In step 1101, images captured at a remote site are projected on a rear or front projection display screen, as described above with reference to FIGS. 4-13. In step 1102, the projected images are filtered, as described above with reference to FIGS. 4-14. In step 1103, light is filtered. For the embodiment where the filters are wavelength division filters, the wavelengths of light reflected and emitted from objects pass through the display screen and are filtered so that the wavelengths of light used to project images on the display screen are different from the wavelengths of light passing through the screen, as described above with reference to FIG. 5. In step 1104, the wavelengths of light passing through the screen are captured, as described above with reference to FIGS. 4-7.

Embodiments of the present invention have been demonstrated using a dnp Holo Screen™ from DNP, a Canon Vixia HF 100 HD camcorder, and a Mitsubishi HC600HD projector. Images were projected onto the holographic screen at an angle of approximately 35° from a distance of approximately 8 ft. The optical path length was folded using a visual-collaborative system similar to the system 800, described above with reference to FIG. 8. The camera was positioned to a have a view of the back of the holographic screen from an average eye height and a distance of approximately 2 ft, which is roughly the distance a viewer stands from the screen.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A visual-collaborative system comprising:
    a display screen having a first surface and a second surface;
    a first projector positioned to project images onto a projection surface of the display screen, wherein the projected images are observable by viewing the second surface, and wherein the projected images are transmitted onto the projection surface at a first set of wavelengths of a first color and a first set of wavelengths of a second color; and
    a first camera system positioned to capture images of objects through the display screen, the first camera system including a first filter disposed between a first camera and the first surface, wherein the first filter passes light at a second set of wavelengths of the first color and a second set of wavelengths of the second color received by the camera but substantially blocks the projected images transmitted onto the projection surface at the first set of wavelengths of the first color and the first set of wavelengths of the second color by the first projector, wherein the first and the second sets of wavelengths of the first color are substantially non-overlapping, and wherein the first and the second sets of wavelengths of the second color are substantially non-overlapping.

2. The system of claim 1 wherein the visual-collaborative system further comprises:
    a second filter in an optical path between a light source of the first projector and the projection surface of the display screen, wherein the second filter passes the light output by the first projector at the first set of wavelengths of the first color and the first set of wavelengths of the second color that is substantially blocked by the first filter while substantially blocking the second set of wavelengths of the first color and the second set of wavelengths of the second color.

3. The system of claim 2 wherein the second filter is to substantially block the second set of wavelengths of the first color and the second set of wavelengths of the second color and substantially transmit the first set of wavelengths of the first color and the first set of wavelengths of the second color.

4. The system of claim 2 wherein the first projector is to transmit the projected images onto the projection surface at the first set of wavelengths of the first color and the first set of wavelengths of the second color.

5. The system of claim 1 wherein the display screen is a rear projection screen and the projection surface of the display screen is the first surface.

6. The system of claim 2 wherein the display screen is a rear projection display screen and the projection surface of the display screen is the first surface.

7. The system of claim 1 further comprising an interactive surface disposed on the second surface enabling a viewer to interact with the images projected onto the second surface.

8. The system of claim 2 further comprising an interactive surface disposed on the second surface enabling a viewer to write on the second surface.

9. The system of claim 1 wherein the display screen is a front projection screen and the projection surface is the second surface.

10. The system of claim 2 wherein the display screen is a front projection screen and the projection surface is the second surface.

11. The system of claim 10 wherein the display screen further includes a half silvered mirror physically located behind a first surface of the display screen.

12. The system of claim 10 wherein the first camera system is positioned so that it is in physical contact with the display screen.

13. The system of claim 1 wherein the display screen is a polarization preserving screen, wherein the first projector is associated with a first wavelength division filter and a first polarizing filter, and further including a second projector associated with a second wavelength division filter and a second polarizing filter.

14. The system of claim 13 wherein the first camera system is associated with the first wavelength division filter.

15. The system of claim 13 wherein the first camera system is associated with the first polarizing filter.

16. The system of claim 13 further including a second camera system positioned to capture images of objects through the display screen, the second camera system including a second filter disposed between the second camera and the second surface of the display screen, wherein the second filter of the second camera system passes the light received by the second camera but substantially blocks the light produced by the first and second projectors, and further wherein the first filter of the first camera system passes the light received by the first camera but substantially blocks the light produced by the first and second projectors.

17. A method comprising:
    projecting images by a projector onto a projection surface of the display screen, wherein the projected images are transmitted onto the projection surface at a first set of wavelengths of a first color and a first set of wavelengths of a second color; and
    simultaneously capturing images of objects through the display screen with a camera system, the camera system including a first filter disposed between a camera and the first surface of the display screen, wherein the first filter passes light at a second set of wavelengths of the first color and a second set of wavelengths of the second color received by the camera but substantially blocks the projected images transmitted onto the projection surface at the first set of wavelengths of the first color and the first set of wavelengths of the second color by the projector, wherein the first and the second sets of wavelengths of the first color are substantially non-overlapping, and wherein the first and the second sets of wavelengths of the second color are substantially non-overlapping.

18. The method of claim 17 further comprising:
filtering light of the projected image through a second filter disposed in an optical path between a light source of a projector and the projection surface of the display screen, wherein the second filter passes the light output by the projector at the first set of wavelengths of the first color and the first set of wavelengths of the second color that is substantially blocked by the first filter while substantially blocking the second set of wavelengths of the first color and the second set of wavelengths of the second color.

19. The method of claim 18, wherein projecting the images further comprises projecting the images at the first set of wavelengths of the first color and the first set of wavelengths of the second color directly from the projector.

* * * * *